United States Patent [19]
Munro et al.

[11] Patent Number: 5,352,058
[45] Date of Patent: Oct. 4, 1994

[54] ROTATABLE CLAMP

[76] Inventors: Paul J. Munro, 27 The Avenue, Newport, New South Wales 2106; Alan Swan, Unit 10/113 Hunter Street, Hornsby, New South Wales 2077, both of Australia

[21] Appl. No.: 956,899
[22] PCT Filed: Jul. 4, 1991
[86] PCT No.: PCT/AU91/00296
§ 371 Date: Mar. 2, 1993
§ 102(e) Date: Mar. 2, 1993
[87] PCT Pub. No.: WO92/01164
PCT Pub. Date: Jan. 23, 1992

[30] Foreign Application Priority Data
Jul. 11, 1990 [AU] Australia ............... PK1137

[51] Int. Cl.$^5$ ............... F16B 2/06; F16B 7/04
[52] U.S. Cl. ............... 403/110; 403/375; 403/380; 403/DIG. 9; 248/230; 248/289.1
[58] Field of Search ............... 403/110, DIG. 9, 380, 403/375, 88, 87; 248/289.1, 230

[56] References Cited
U.S. PATENT DOCUMENTS

| | | | |
|---|---|---|---|
| 973,206 | 10/1910 | Parizek | 403/110 X |
| 1,627,901 | 5/1927 | Hills | 403/110 X |
| 2,251,253 | 7/1941 | Miller | 403/110 X |
| 3,126,191 | 3/1964 | Holden | 248/286 |
| 4,185,808 | 1/1980 | Donohoe et al. | 403/344 X |
| 4,720,952 | 1/1988 | Fricker | 403/380 X |
| 4,936,702 | 6/1990 | Hsu | 403/375 X |
| 4,964,603 | 10/1990 | Yair | 248/230 |

FOREIGN PATENT DOCUMENTS
8802716 4/1988 PCT Int'l Appl.

Primary Examiner—Randolph A. Reese
Assistant Examiner—Christopher J. Novosad
Attorney, Agent, or Firm—Ladas & Parry

[57] ABSTRACT

In order to allow a first element (2) and a second element (1) to be tightly clamped together, and yet be easily and quickly unclamped for adjustments to be made to their relative positions, a rotatable clamp is provided. The rotatable clamp comprises three main parts: a first circular plate (4) attached to the element (2) and having a bolt (5) extending from the center thereof, a second circular plate (6) attached to element (1) and having a bolt hole (7) at the center thereof and a nut (8) having a handle (9) attached thereto for screwing onto the bolt (5) so as to force the two circular plates together. Each of the two plates (4) and (6) is provided, on the face contacting the other plate, with a series of circular, concentric grooves (12) and ridges (13) arranged to fit together with the ridges of one plate fitting into the grooves of the other plate as the plates are brought into contact with each other. The provision of the grooves and ridges on the faces of the plates contacting each other substantially increases the frictional forces between the plates when they are in contact so that they do not require a very large contact force to be and yet provide adequate clamping force. This means that the nut can be easily loosened when required and the circular shape of the ridges and grooves allows the plates to be rotated with respect to each other without the plates having to be completely separated from each other.

7 Claims, 2 Drawing Sheets

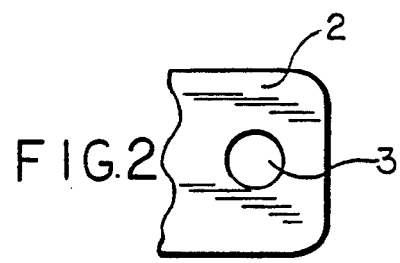
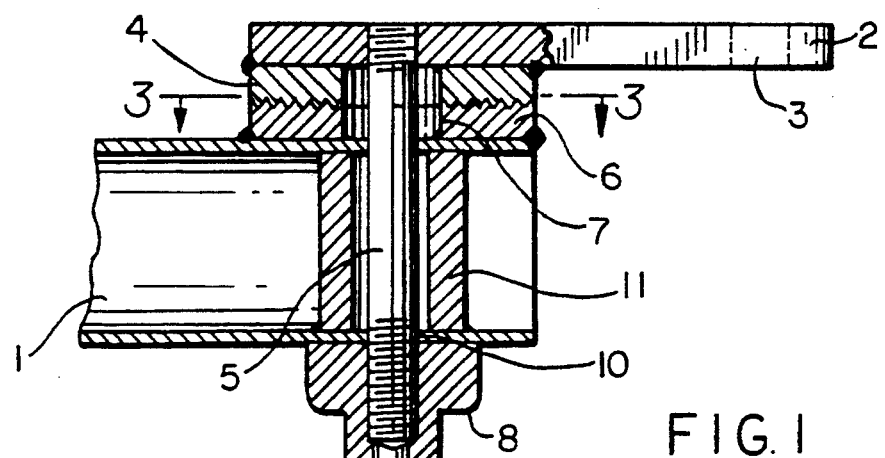
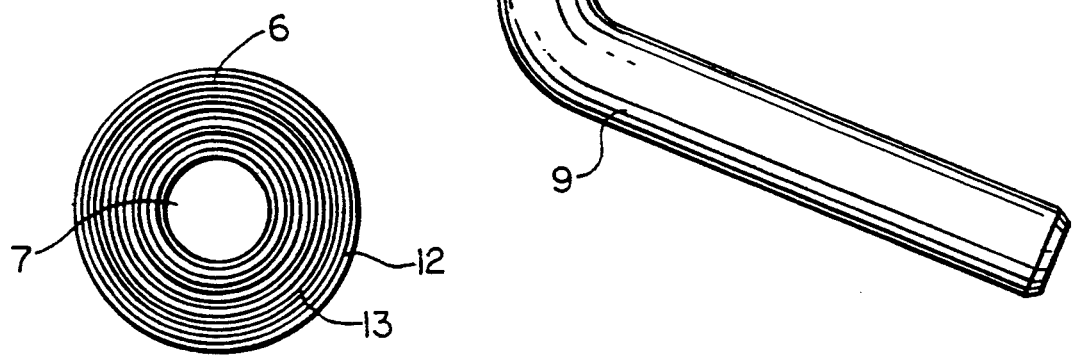

5,352,058

ROTATABLE CLAMP

BACKGROUND OF THE INVENTION

This invention relates to rotatable clamps of the type used for clamping two relatively rotatable parts together.

In many situations it is necessary to loosen a clamping means holding two relatively rotatable parts together to adjust their positions and then to tighten the clamping means to hold them tightly in the adjusted position. Examples of such situations abound in various types of adjustable machinery and devices. The most common clamping means used in such cases is a simple nut and bolt, perhaps with washers on either side of the parts to be clamped to increase the frictional forces acting on the parts to be clamped.

The problem with such nut-and-bolt clamping means is that they must be tightened very firmly or else the two parts will not be properly clamped together. In the case of very heavy parts or parts on which a high load is to be imposed after clamping, especially if the bolt is held substantially horizontally so that gravity assists the torque acting to loosen the nut-and-bolt clamp, the tightening of the nut must be very carefully controlled so as to tighten adequately but not to be turned so far as to strip the thread from the bolt or to damage the parts being clamped.

It is therefore an object of the present invention to provide a rotatable clamp which can be easily tightened and loosened but which still provides a large clamping force.

SUMMARY OF THE INVENTION

Accordingly, the invention provides a rotatable clamp for clamping first and second relatively rotatably elements together, the clamp comprising a first plate for attaching to the first element, a second plate for attaching to the second element and clamping means for clamping the two plates together, in use, wherein the two plates are provided with a plurality of matching concentric indentations and protruberances on the sides facing each other so that the protruberances on one plate fit into the indentations on the other plate whereby when the two elements are to be clamped together the two plates are clamped together by the clamping means so that the protruberances and indentations on the plates are thereby in contact to provide a frictional clamping force and when the clamping means is loosened, the two plates can rotate with respect to each other.

Preferably, the clamping means comprises a bolt extending from the center of one of the plates and, in use, passing through an aperture in the other plate and a nut for screwing onto the bolt so as to clamp the two plates together.

In a preferred embodiment, the clamping means comprises a bolt extending from the center of one of the plates and, in use, passing through an aperture in the other plate and a nut for screwing onto the bolt so as to camp the two plates together.

In one embodiment, the matching concentric protrusions and indentations are formed by concentric circular ridges provided in the opposing faces of the plates. However, in a different embodiment, the matching concentric protrusions and indentations are formed by a plurality of concentric series of protrusions arranged in circles with circular channels between each circular series of protrusions so that the plates can relatively rotate when slightly loosened. Since the protruberances and indentations provide a large frictional clamping force, the nut and bolt do not need to be tightened as greatly as previously and therefore can be more easily loosened. Thus adjustment of the relative positions of the elements is quick and easy yet still providing adequate clamping force for large torques.

In a preferred embodiment, a handle is provided on the nut so that it can be tightened and loosened by hand. It has been found that even such hand tightening is enough to adequately clamp a heavy car transmission casing on a mounting jig.

BRIEF DESCRIPTION OF THE DRAWINGS

One embodiment of a rotatable clamp according to the invention will now be more fully described, by way of example, with reference to the drawings, of which:

FIG. 1 is a part cross-sectional side view through apparatus incorporating a rotatable clamp according to the invention;

FIG. 2 is a part plan view of the apparatus of FIG. 1;

FIG. 3 is a part cross-sectional view on line III—III of FIG. 1; and

DETAILED DESCRIPTION OF THE INVENTION

Figure 4:
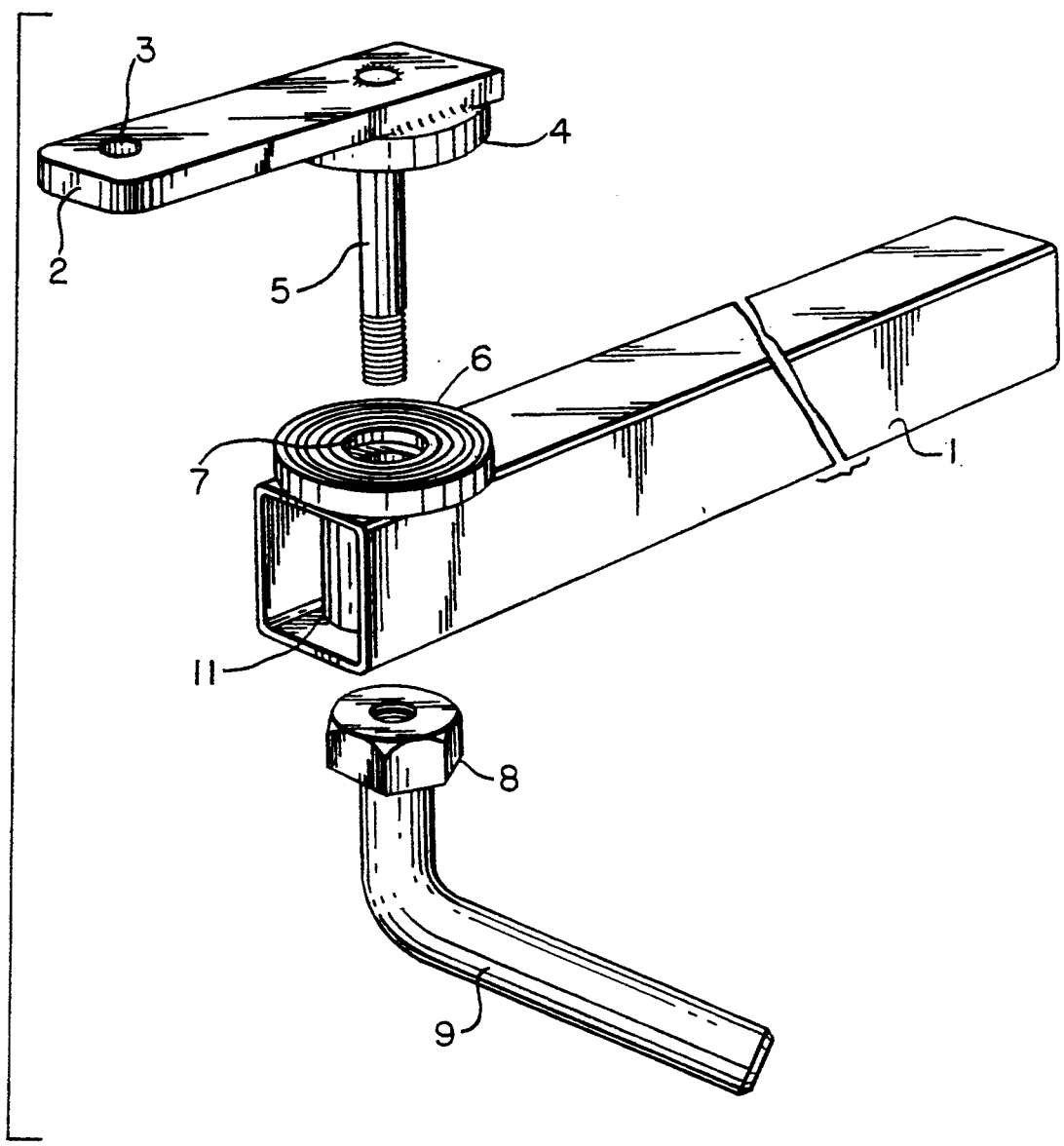
FIG. 4 is an exploded perspective view of the apparatus of FIG. 1.

Thus, there is shown in the drawings, apparatus comprising a square cross-section bar 1 and a mounting bracket 2. The bar 1 may form part of more complex machinery (not shown) such as, for example, a jig for mounting a transmission casing, as described in Australian Provisional Patent Application No. PK0320 (PCT Application No. PCT/AU91/00210). In this case, the bracket 2 is rotatably mounted for adjustment on the bar 1 and includes a mounting hole 3 therethrough for mounting the transmission casing (not shown).

In order to allow the bracket 2 and the bar 1 to be tightly clamped together, and yet be easily and quickly unclamped for adjustments to be made to their relative positions, a rotatable clamp formed in accordance with the inventive concept is provided on the apparatus.

The rotatable clamp comprises three main parts: a first circular plate 4 having a bolt 5 extending from the center thereof, a second circular plate 6 having a bolthole 7 at the center thereof and a nut 8 having a handle 9 attached thereto for screwing onto the bolt 5. The first circular plate 4 is attached to the bracket 2, for example by welding, and the bolt 5 extends from the center of the plate 4 at the axis of rotation of the bracket 2. The bolt 5 is also attached to the plate 4 and the bracket 2, for example by welding, so as to rotate therewith. The second circular plate 6 is attached to the bar 1, again, for example by welding, so that the bolthole 7 is positioned at the axis of rotation of the bar 1.

In order to clamp the bracket 2 and bar 1 together, the bolt 5 is passed through the bolthole 7 in second circular plate 6 and through a corresponding hole 10 in bar 1. The hole 10 in bar 1 is preferably reinforced when passing though the hollow bar by a sleeve 11, as best shown in FIG. 1. The nut 8 is then screwed on to the end of the bolt 5 using handle 9 so as to draw the bracket 2 and bar 1 together and, consequently, to force the two plates to contact each other between the bracket and the bar.

Each of the two plates 4 and 6 is provided, on the face contacting the other plate, with a series of circular, concentric grooves 12 and ridges 13 arranged to fit together with the ridges of one plate fitting into the grooves of the other plate as the plates are brought into contact with each other. As best seen in FIG. 1, the grooves and ridges are preferably of a regular sawtooth cross-section, but other cross-sectional shapes such as a wavy cross-section could alternatively be used as long as the grooves and ridges on the two plates matched each other.

The provision of the grooves and ridges on the faces of the plates contacting each other substantially increases the frictional forces between the plates when they are in contact so that they do not require a very large contact force to be applied by overtightening the nut on the bolt and yet provide adequate clamping force. This means that the nut can be easily loosened when required and the circular shape of the ridges and grooves allows the plates, and the bracket and bar, to be rotated with respect to each other without the plates having to be completely separated from each other.

It will, of course, be apparent that the rotatable clamp of the invention can be utilized in many different applications and can be adapted and changed to suit different uses and purposes without departing from the essential features of the invention as set out in the summary of the invention.

It will also be apparent that although, as described, the plates are clamped together using a nut and bolt assembly, any other suitable clamping device, such as those well known in the art, could alternatively be used.

We claim:

1. A rotatable clamp for clamping first and second relatively rotatable elements together, the clamp comprising a first plate for attaching to the first element, a second plate for attaching to the second element and clamping means for clamping the two plates together in use, wherein the two plates are provided with a plurality of matching alternating concentric circular ridges and grooves provided in the opposing faces of the plates, so that the ridges on one plate fit into the grooves on the other plate whereby when the two elements are to be clamped together the two plates are clamped together by the clamping means so that the ridges and grooves on the plates are thereby in contact to provide a frictional clamping force, and when the clamping means is loosened, the two plates can rotate with respect to each other.

2. A rotatable clamp according to claim 1, wherein the clamping means comprises a bolt extending from the centre of one of the plates and, in use, passing through an aperture in the other plate and a nut for screwing onto the bolt so as to clamp the two plates together.

3. A rotatable clamp according to claim 2, further comprising a handle provided on the nut so that it can be tightened and loosened by hand.

4. A rotatable clamp according to claim 1 further comprising a handle attached to the clamping means to facilitate tightening and loosening thereof.

5. A rotatable clamp according the claim 1 wherein said second element is a holding jig for an automobile said transmission, said clamping means comprising bracket means attached to said first plate for attaching the first plate to the first element.

6. A rotatable clamp according to claim 1 in combination with an automobile transmission holding jig.

7. A rotatable clamp according to claim 1, wherein each of said concentric ridges is formed by a plurality of protrusions arranged in a circle.

* * * * *